United States Patent
Kang

(10) Patent No.: US 12,140,162 B2
(45) Date of Patent: Nov. 12, 2024

(54) SPOOL VALVE AND HYDRAULIC APPARATUS INCLUDING THE SAME

(71) Applicant: VOLVO CONSTRUCTION EQUIPMENT AB, Eskilstuna (SE)

(72) Inventor: Minheuk Kang, Gyeongsangnam-do (KR)

(73) Assignee: VOLVO CONSTRUCTION EQUIPMENT AB, Eskilstuna (SE)

( * ) Notice: Subject to any disclaimer, the term of this patent is extended or adjusted under 35 U.S.C. 154(b) by 513 days.

(21) Appl. No.: 17/608,815

(22) PCT Filed: May 30, 2019

(86) PCT No.: PCT/KR2019/006540
§ 371 (c)(1),
(2) Date: Nov. 4, 2021

(87) PCT Pub. No.: WO2020/241936
PCT Pub. Date: Dec. 3, 2020

(65) Prior Publication Data
US 2022/0299046 A1    Sep. 22, 2022

(51) Int. Cl.
*F15B 11/00* (2006.01)
*F15B 13/01* (2006.01)
(Continued)

(52) U.S. Cl.
CPC ............ *F15B 11/003* (2013.01); *F15B 13/01* (2013.01); *F15B 13/025* (2013.01); *F16K 11/07* (2013.01);
(Continued)

(58) Field of Classification Search
CPC ............ F15B 2211/30515; F15B 13/01; F15B 11/003; F16K 31/363
See application file for complete search history.

(56) References Cited

U.S. PATENT DOCUMENTS

| 4,238,112 A | 12/1980 | Derozier |
| 5,613,519 A | 3/1997 | Ishizaki |

(Continued)

FOREIGN PATENT DOCUMENTS

| CN | 107250563 A | 10/2017 |
| EP | 0831181 A1 | 3/1998 |

(Continued)

OTHER PUBLICATIONS

International Search Report and Written Opinion of the International Searching Authority, PCT/KR2019/006540, mailed Feb. 27, 2020, 7 pages.

(Continued)

*Primary Examiner* — Abiy Teka
(74) *Attorney, Agent, or Firm* — Sage Patent Group

(57) ABSTRACT

A spool valve is provided. A valve housing has a pilot fluid passage, and a first portion and a second portion lengthwise spaced apart from each other. A spool is movably inserted in the valve housing, and includes a plug able to enter the pilot fluid passage between the first portion and the second portion to change a flow area of the pilot fluid passage following movement of the spool. A hydraulic machine provides that when pilot fluid is supplied to the pilot fluid passage through the first portion, at least a portion of the supplied pilot fluid is provided to the holding valve through the second portion. The holding valve allows a flow of working fluid from the first chamber to the spool valve, and the spool moves to a third position to forward working fluid to the second chamber.

19 Claims, 3 Drawing Sheets

(51) Int. Cl.
  *F15B 13/02*  (2006.01)
  *F16K 11/07*  (2006.01)
  *F16K 27/04*  (2006.01)
  *F16K 31/363* (2006.01)

(52) U.S. Cl.
  CPC .......... *F16K 27/041* (2013.01); *F16K 31/363*
       (2013.01); *F15B 2211/30515* (2013.01)

(56) References Cited

U.S. PATENT DOCUMENTS

| | | | |
|---|---|---|---|
| 10,100,849 B2 | 10/2018 | Reynolds et al. | |
| 2007/0056437 A1* | 3/2007 | Bosebeck | F15B 11/17 91/6 |
| 2009/0145123 A1 | 6/2009 | Hwang | |
| 2013/0277582 A1* | 10/2013 | Kang | F15B 13/015 251/89 |

FOREIGN PATENT DOCUMENTS

| | | | | |
|---|---|---|---|---|
| EP | 2687764 A1 | * | 1/2014 | .......... F15B 13/0402 |
| JP | S62110006 A | | 5/1987 | |
| JP | H1096402 A | | 4/1998 | |
| KR | 970043414 U | | 7/1997 | |
| KR | 20-0221599 Y1 | | 11/2001 | |
| KR | 20090060732 A | | 6/2009 | |
| KR | 10-2010-0039725 A | | 4/2010 | |

OTHER PUBLICATIONS

Office Action for Chinese Patent Application No. 201980096837.1, mailed Sep. 19, 2023, 5 pages.
Extended European Search Report for European Application No. 19930867.7, mailed Nov. 21, 2022, 8 pages.

* cited by examiner

[Fig. 1]
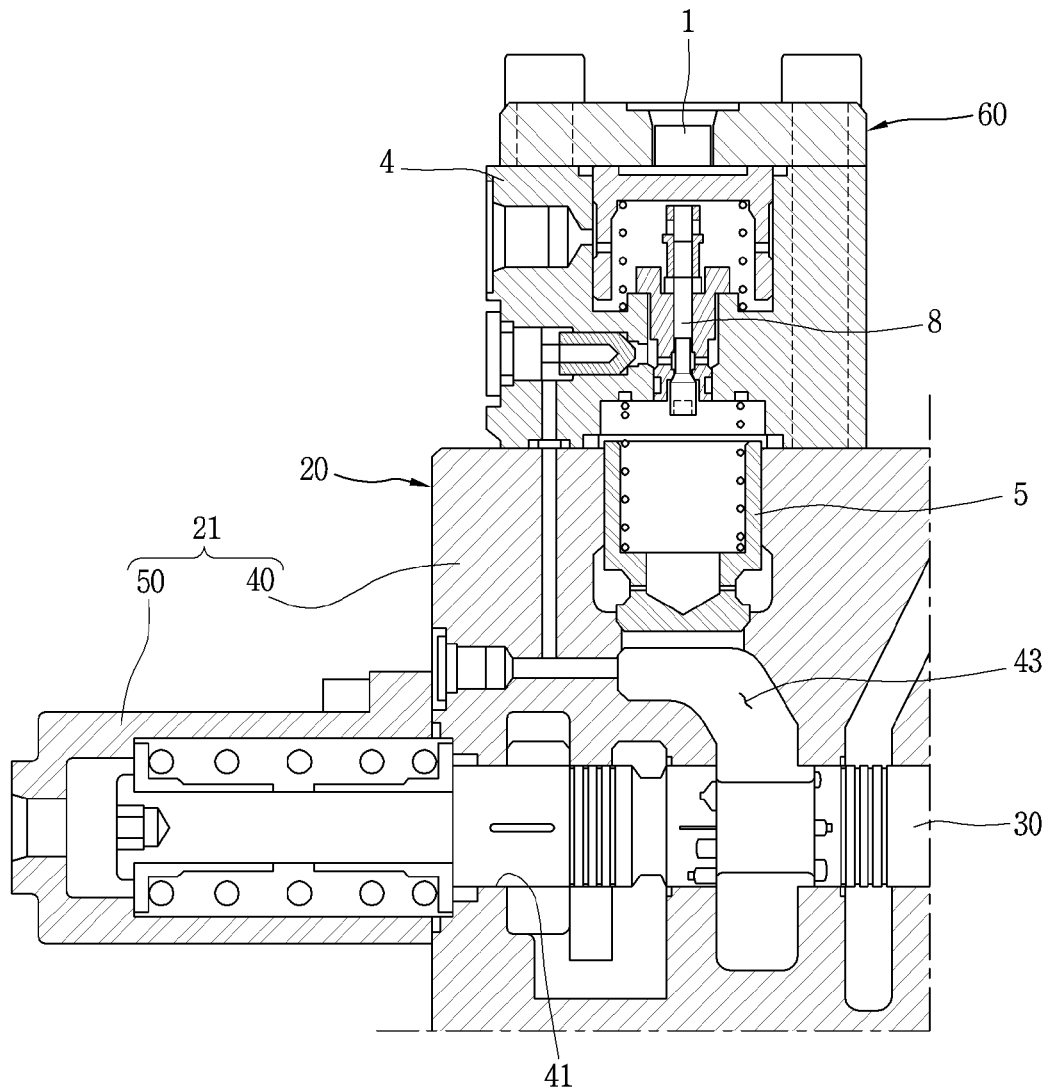
[Fig. 2]
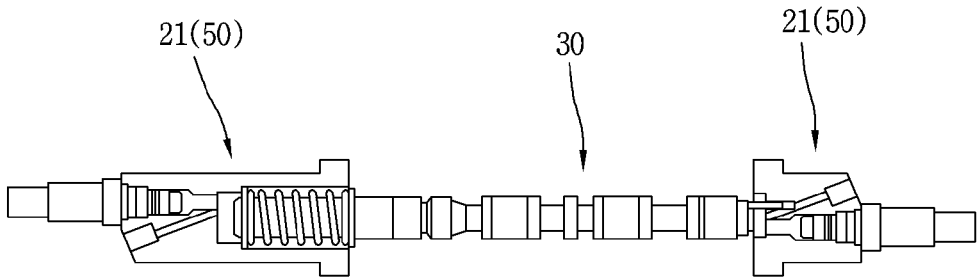

[Fig. 3]
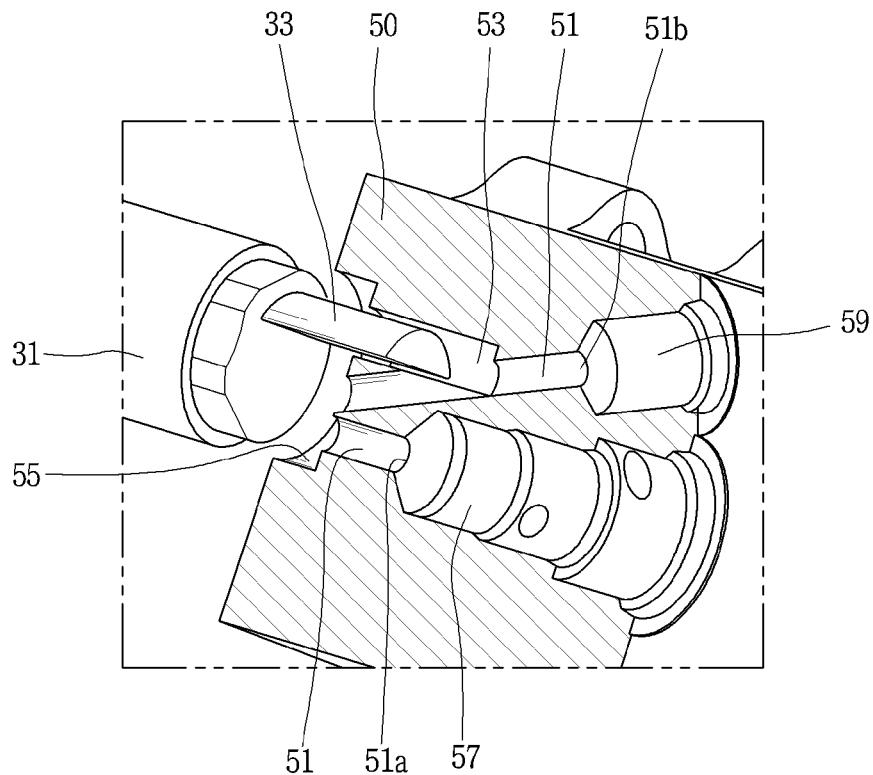
[Fig. 4]
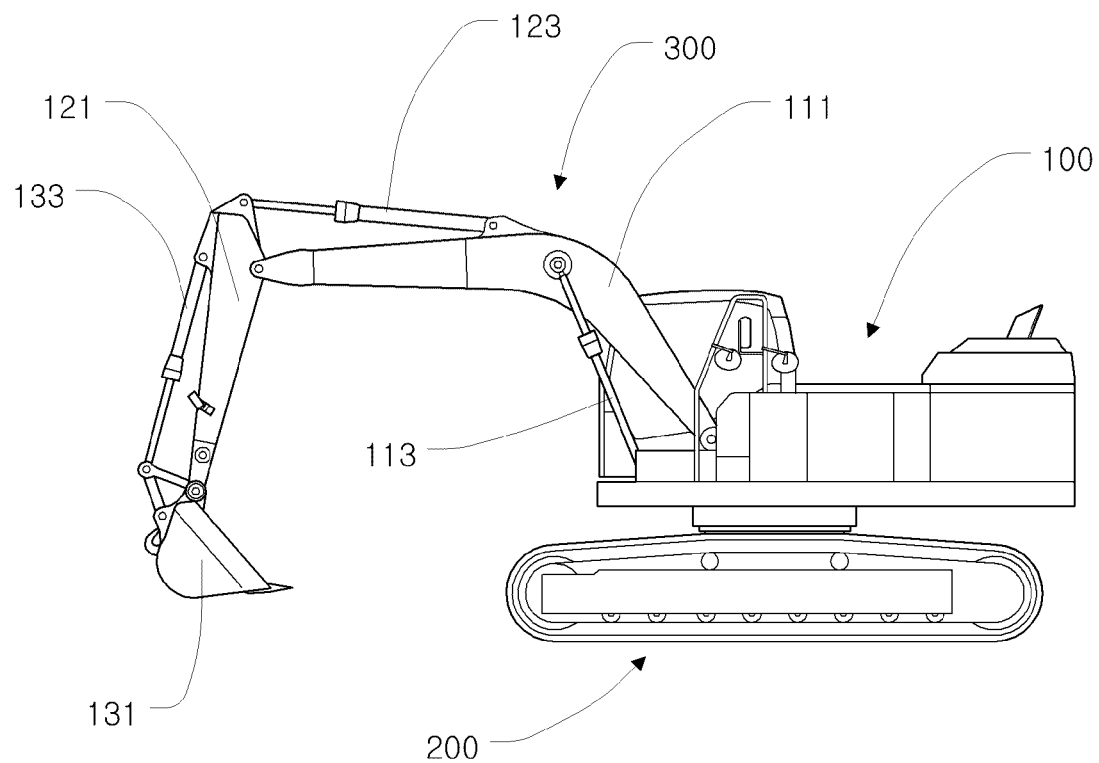

[Fig. 5]
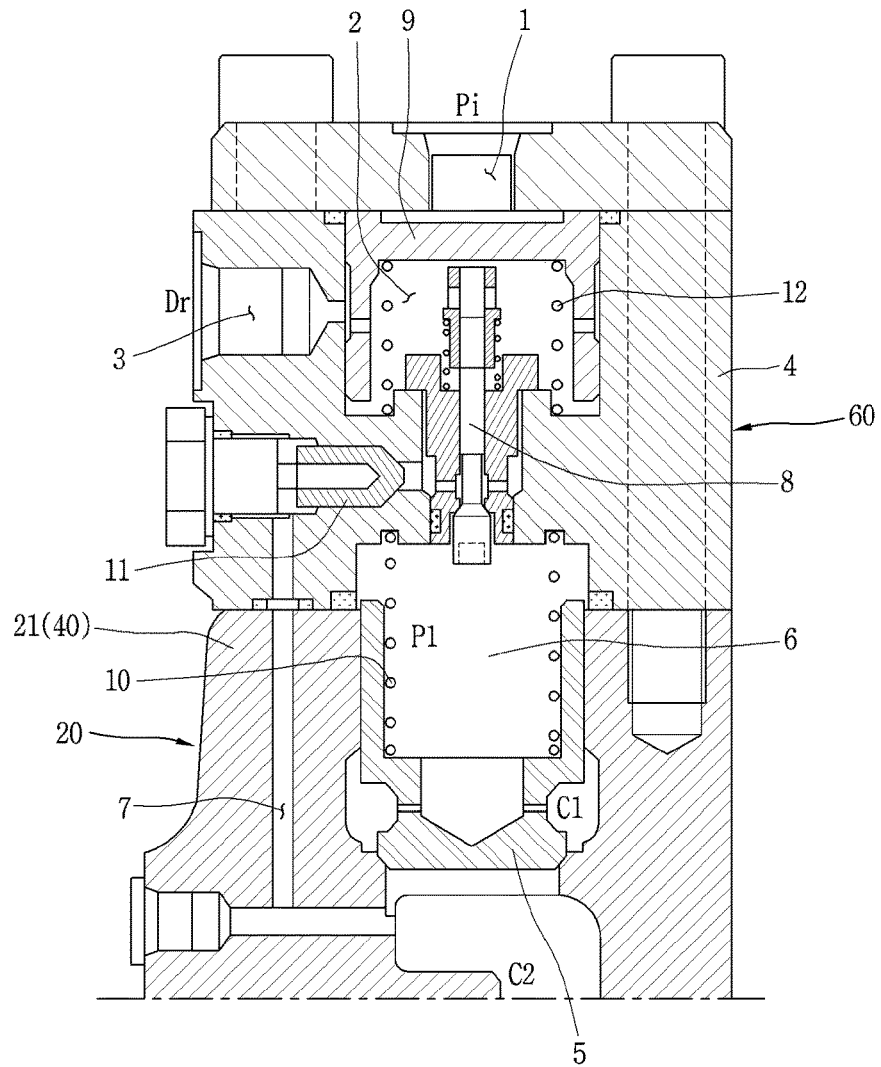
[Fig. 6]
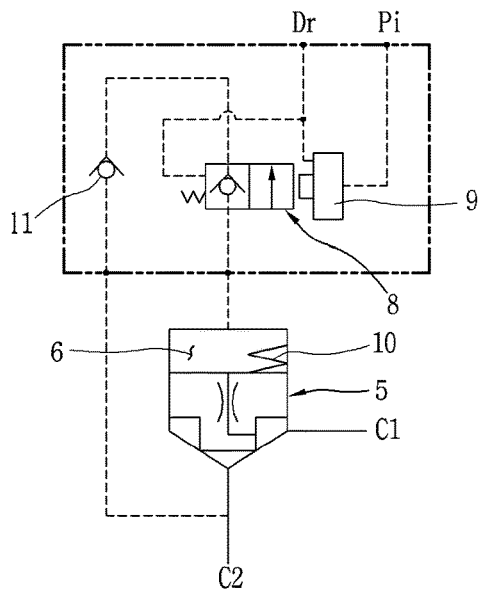

SPOOL VALVE AND HYDRAULIC APPARATUS INCLUDING THE SAME

TECHNICAL FIELD

The present disclosure relates to a spool valve, by which the structure of a pilot hydraulic circuit can be simplified, and a hydraulic apparatus including the same.

BACKGROUND ART

A variety of hydraulic machines operating by using high-pressure working fluid are well-known in the art. Such hydraulic machines use a variety of valves to control flows of high-pressure working fluid. Some of such valves are operated by pressure of pilot fluid applied thereto.

FIG. 1 schematically illustrates an assembled configuration of (a portion of) a spool valve 200 and a boom holding valve 60 in a hydraulic machine of the related art.

The spool valve 20, illustrated in FIG. 1, includes a spool 30 and a valve housing 21. The valve housing 21 includes a valve body 40 and a cover 50. The valve body 40 may have a slide hole 41 defined therein. The valve body 40 may also have a working fluid passage 43 defined therein, the working fluid passage 43 allowing working fluid to flow therethrough. The spool 30 is movable in the slide hole 41 to change a flow of the working fluid in the working fluid passage 43. FIG. 1 illustrates a structure in which the boom holding valve 60 is connected to (the valve body 40 of) the valve housing 21 of the spool valve 20.

The boom holding valve 60 includes a valve block 4, a poppet valve 5, and an auxiliary valve 8. It is necessary to apply pilot pressure through a pilot port 1 to operate the auxiliary valve 8. However, the hydraulic machine of the related art has a structure in which pilot pressure is applied to the auxiliary valve 8 via a component separate from the spool valve 20. Therefore, in hydraulic machines of the related art, the pilot hydraulic circuit has a complicated structure, which has been pointed out as a drawback.

DISCLOSURE OF INVENTION

Solution to Problem

Various aspects of the present disclosure provide a spool valve, by which the structure of a pilot hydraulic circuit can be simplified. In addition, the present disclosure is intended to prevent the spool from rotating, so as to reduce wear of the spool valve.

To overcome the above-described objects, a spool valve and a hydraulic machine may be provided.

According to an aspect of the present disclosure, a spool valve may include: a valve housing having a pilot fluid passage defined therein, the pilot fluid passage allowing pilot fluid to flow therethrough, and including a first portion and a second portion lengthwisely spaced apart from each other, and a spool movably inserted in the valve housing, the spool including a plug able to enter the pilot fluid passage between the first portion and the second portion to change a flow area of the pilot fluid passage following movement of the spool.

According to another aspect of the present disclosure, a hydraulic machine may include: the above-described spool valve; an actuator connected to the spool valve, and including a first chamber and a second chamber; and a holding valve provided between the spool valve and the first chamber, the holding valve connected to the second portion. When the spool is in a first position in which a flow of working fluid between the spool valve and the actuator is blocked, fluid within the pilot fluid passage may be drained through the first portion, and the holding valve may be block a flow of working fluid from the first chamber to the spool valve.

According to another aspect of the present disclosure, a hydraulic machine may include: the above-described spool valve; an actuator connected to the spool valve, and including a first chamber and a second chamber; and a holding valve provided between the spool valve and the first chamber, the holding valve connected to the second portion. When the spool moves to a second position in which the spool valve forwards working fluid to the first chamber and receives working fluid from the second chamber, fluid within the pilot fluid passage may be drained through the first portion, and the holding valve may move to allow a flow of working fluid from the spool valve to the first chamber.

According to another aspect of the present disclosure, a hydraulic machine may include: the above-described spool valve; an actuator connected to the spool valve, and including a first chamber and a second chamber; and a holding valve provided between the spool valve and the first chamber, the holding valve connected to the second portion. When pilot fluid is supplied to the pilot fluid passage through the first portion, at least a portion of the supplied pilot fluid may be provided to the holding valve through the second portion, so that the holding valve moves to allow a flow of working fluid from the first chamber to the spool valve, and the spool may move to a third position in which the spool valve forwards working fluid to the second chamber, and receives working fluid from the first chamber.

According to some embodiments, the actuator may be a boom actuator, the first chamber may be a large chamber, and the second chamber may be a small chamber, and the holding valve may be a boom holding valve.

According to some embodiments, the actuator includes an arm actuator, the first chamber may be a small chamber, and the second chamber may be a large chamber, and the holding valve may be an arm holding valve.

As set forth above, according to the present disclosure, a pilot fluid passage is provided within the spool, thereby preventing fluid from leaking. In addition, since the spool is prevented from rotating, wear of the spool valve can be reduced.

The methods and apparatuses of the present disclosure have other features and advantages that will be apparent from, or that are set forth in greater detail in, the accompanying drawings, the disclosures of which are incorporated herein, and in the following Detailed Description, which together serve to explain certain principles of the present disclosure.

BRIEF DESCRIPTION OF DRAWINGS

FIG. 1 schematically illustrates an assembled configuration of (a portion of) a spool valve and a boom holding valve in a hydraulic machine of the related art;

FIG. 2 schematically illustrates (a portion of) a valve housing and a spool of a spool valve according to exemplary embodiments;

FIG. 3 is a partially enlarged view of FIG. 2;

FIG. 4 schematically illustrates a structure of a hydraulic machine according to exemplary embodiments;

FIG. 5 schematically illustrates an assembled configuration of (a portion of) the spool valve and the boom holding valve of the hydraulic machine according to exemplary embodiments; and FIG. 6 is a hydraulic circuit diagram of the boom holding valve illustrated in FIG. 5.

MODE FOR THE INVENTION

The present disclosure will be described in detail hereinafter with reference to the accompanying drawings.

FIG. 2 schematically illustrates (a portion of) a valve housing and a spool of a spool valve according to exemplary embodiments, while FIG. 3 is a partially enlarged view of FIG. 2.

In some embodiments, the spool valve may include a valve housing 21 and a spool 30.

In some embodiments, the valve housing 21 may include a valve body (not shown) in which (a spool main body 31 of) the spool 30 is movably inserted. In some embodiments, the valve housing 21 may include covers 50 connected to the valve body so as to cover both ends of the spool 30.

The valve housing 21 (the valve body of the valve housing 21) may have a slide hole defined therein. In addition, the valve housing 21 (the valve body of the valve housing 21) may have a working fluid passage defined therein, the working fluid passage allowing working fluid to flow therethrough.

The valve housing 21 (the covers 50 of the valve housing 21) may have a pilot fluid passage 51 defined therein, the pilot fluid passage 51 allowing pilot fluid to flow therethrough. The pilot fluid passage 51 may include a first portion 51*a* and a second portion 51*b* lengthwisely spaced apart from each other.

In some embodiments, the spool 30 may include the spool main body 31 and a plug 33.

The spool main body 31 may be movable in the slide hole to change flows of the working fluid in the working fluid passage. In some embodiments, the plug 33 may be a separate member connected to the spool main body 31. In some alternative embodiments, the plug 33 and the spool main body 31 may be provided as a single entity. In some alternative embodiments, the plug 33 may be configured to work in concert with the spool main body 31 via a third medium. When (the spool main body 31 of) the spool 30 is moved, the plug 33 may be moved along with the spool 30. In some embodiments, the plug 33 may be provided on an end of the spool 30. In some of such embodiments, the plug 33 may be connected to an end of the spool main body 31.

In some embodiments, the spool valve may be a three-position valve in which the spool 30 may be in a first position, i.e. a neutral position, and may be in a second position and a third position, i.e. non-neutral positions. FIG. 3 illustrates an example in which the spool 30 is in the first position. However, this is merely illustrative, and when the spool main body 31 is in the first position, an end of the plug 33 may be located on the left or the right of the position in FIG. 3. In the illustration of FIG. 3, when the spool 30 is moved to the right, the spool 30 will be described as being switched from the first position to the second position, and when the spool 30 is moved to the left, the spool 30 will be described as being switched from the first position to the third position. (Although it will be described hereinafter that the boom is lifted when the spool 30 is switched to the second position and the boom is lowered when the spool 30 is switched to the third position, this is only illustrative. Whether the boom is lifted or lowered is determined by the structure of the working fluid passage formed in the valve body.)

The plug 33 may be configured to be able to enter the pilot fluid passage 51 between the first portion 51*a* and the second portion 51*b*, so as to change the flow area of the pilot fluid passage 51. In some embodiments, (the covers 50 of) the valve housing 21 may have a guide hole 53 defined therein connected to the pilot fluid passage 51 between the first portion 51*a* and the second portion 51*b*. The plug 33 may enter the pilot fluid passage 51 through the guide hole 53. In some embodiments, the cross-sections of the plug 33 and the guide hole 53 across the lengths of the plug 33 and the guide hole 53 may be shaped to prevent rotation of the plug 33. For example, the cross-sectional shape of both the plug 33 and the guide hole 53 may be non-circular.

In some embodiments, the lengths and relative positions of the plug 33 and the guide hole 53 may be determined such that the plug 33 is not dislodged from the guide hole 53, even when the spool is moved (for example, even when the spool is moved farthest to the left or right from the position in FIG. 3). For example, even when the plug 33 is moved farthest away from the pilot fluid passage 51 (due to movement farthest to the left from the position in FIG. 3), the plug 33 may be inserted in the guide hole 53, for example, by about 3 mm, thereby preventing the plug 33 from being dislodged from the guide hole 53.

In some embodiments, when the plug 33 is moved farthest to the right from the position in FIG. 3, thereby entering the pilot fluid passage 51 as deeply as possible, the flow area of the pilot fluid passage 51 may be minimized. In some embodiments, the minimum flow area may be greater than zero. For example, the spool valve may be designed such that, when the plug 33 enters the pilot fluid passage 51 as deeply as possible, a distance between the terminal end of the plug 33 and the inner wall surface of the pilot fluid passage 51 is 1 mm.

In some embodiments, the first portion 51*a* may be connected to a pressure reducing valve (not shown), such that the pilot fluid passage 51 fluidly communicates with the pressure reducing valve. In some of such embodiments, the pressure reducing valve may be an electronic proportional pressure reducing valve. In some embodiments, the valve housing 21 may have a cavity 57 in which the electronic proportional pressure reducing valve is accommodated. In such embodiments, the first portion 51*a* may fluidly communicate with the cavity 57.

In some embodiments, the second portion 51*b* may be connected to a pilot-operated valve. In some embodiments, (the covers 50 of) the valve housing 21 may include a port 59 to which the pilot-operated valve is to be connected. In such embodiments, the second portion 51*b* may be in fluid communication with the port 59.

In some embodiments, the valve housing 21 may include a pressure chamber 55 to apply pilot pressure to the spool 30 (the spool main body 31 of the spool 30). In some embodiments, the pressure chamber 55 may be connected to the pilot fluid passage 51 between the first portion 51*a* and the second portion 51*b*. Therefore, pilot fluid supplied through the first portion 51*a* may apply pilot pressure to the spool 30 (spool main body 31) in the pressure chamber 55 to move the spool 30 to the third position, and apply pilot pressure to the pilot-operated valve through the second portion 51*b* to move the pilot-operated valve.

FIG. 4 schematically illustrates a structure of a hydraulic machine according to exemplary embodiments.

The hydraulic machine may use hydraulic pressure to operate a working device 300 to work. In some embodiments, the hydraulic machine may be a construction machine.

In some embodiments, the hydraulic machine may be an excavator as illustrated in FIG. 1. The hydraulic machine may include an upper structure 100, an under structure 200, and the working device 300.

The under structure 200, including a traveling actuator, allows the hydraulic machine to travel. The traveling actuator may be a hydraulic motor.

The upper structure 100 may include a pump, a tank, a power source, a main control valve (MCV), and the like. In some embodiments, the MCV may include a plurality of spool valves. In addition, the upper structure 100 may include a swing actuator so as to be rotatable, relative to the under structure 200. The swing actuator may be a hydraulic motor.

The excavator can work using the working device 300. The working device 300 may include a boom 111, an arm 121, and a bucket 131, as well as a boom actuator 113, an arm actuator 123, and a bucket actuator 133 actuating the boom 111, the arm 121, and the bucket 131. The boom actuator 113, the arm actuator 123, and the bucket actuator 133 may be hydraulic cylinders.

FIG. 5 schematically illustrates an assembled configuration of (a portion of) the spool valve and the boom holding valve of the hydraulic machine according to exemplary embodiments, and FIG. 6 is a hydraulic circuit diagram of the boom holding valve illustrated in FIG. 5.

In some embodiments, the hydraulic machine may include a spool valve 20, a boom actuator, and a boom holding valve 60.

As described above, a first portion of the spool valve 20 may be connected to a pressure reducing valve, such that pilot fluid passage may fluidly communicate with the pressure reducing valve. In some embodiments, the pressure reducing valve may be an electronic proportional pressure reducing valve. As described above, a second portion of the spool valve 20 may be connected to (the pilot port 1 of) the boom holding valve 60. In some embodiments, the second portion of the spool valve 20 may also be connected to a center bypass valve (CBP).

In some embodiments, the boom actuator may be connected to the spool valve 20. The boom actuator may include a large chamber and a small chamber.

In some embodiments, the boom holding valve 60 may be provided between the spool valve 20 and the large chamber of the boom actuator.

In some embodiments, the boom holding valve 60 may include a valve block 4, a poppet valve 5, and an auxiliary valve 8.

In some embodiments, the valve block 4 may include the pilot port 1 through which pilot pressure Pi is applied and a drain port (Dr) 3 through which fluid is drained from pilot pressure chamber 2.

In some embodiments, a flow passage 7 connecting a back chamber 6 of the poppet valve 5 and a point C2 may be provided in the valve body of the spool valve 20 and the valve block of the boom holding valve 60. The point C2 may be connected to a working fluid passage in the valve body of the spool valve 20. The point C1 may be connected to the large chamber of the boom actuator.

In some embodiments, the poppet valve 5 may allow or block a flow of working fluid between the large chamber of the boom actuator and the working fluid passage of the spool valve 20. In this regard, in some embodiments, the poppet valve 5 may open and close a flow passage between a point C1 and the point C2. When the spool of the spool valve 20 is in the first position, i.e. the neutral position, the poppet valve 5 may close the flow passage to prevent the boom from freely falling down.

The auxiliary valve 8 may be movably disposed in the valve block 4. The auxiliary valve 8 may be connected to the poppet valve 5. In some embodiments, the auxiliary valve 8 may include a piston 9. In some embodiments, the second portion of the spool valve 20 may be connected to (the piston 9 of) the auxiliary valve 8 through the pilot port 1. When pilot pressure is applied to the piston 9, the auxiliary valve 9 may be moved to open the flow passage 7.

1) When Spool is in First Position

When the spool is in the neutral position, i.e. the first position, a flow of working fluid between the spool valve 20 and the boom actuator is blocked.

In this case, fluid in the pilot fluid passage is drained through the first portion. Consequently, the auxiliary valve 8 is closed to block the flow of fluid through the flow passage 7.

In addition, the boom holding valve 60 blocks a flow of working fluid from the large chamber to the spool valve 20. A holding function of preventing the boom from freely falling down when the spool of the spool valve 20 is in the neutral position, i.e. the first position, will be now described in detail.

When the spool main body is in the first position, a resultant force of the pressure of working fluid pressing the top portion of the poppet valve 5 and the elastic force of a spring 10 pressing the top end of the poppet valve 5 is greater than a pressure of working fluid pressing the bottom end of the poppet valve 5. (Due to a difference between areas, the pressure of the working fluid pressing the bottom end of the poppet valve 5 is less than the pressure of the working fluid pressing the top end of the poppet valve 5.) Consequently, the poppet valve 5 blocks a flow passage between the point C1 and the point C2. That is, since working fluid from the large chamber of the boom actuator is blocked from returning to a tank through the spool valve 20, the boom may be prevented from freely falling down.

2) When Spool is in Second Position

When the spool is moved to the second position, i.e. a non-neutral position, the boom holding valve 60 is moved to allow a flow of working fluid from the spool valve 20 to the large chamber. Specifically, high-pressure working fluid supplied to the working fluid passage of the spool valve 20 opens the poppet valve 5, and thus, is supplied to the large chamber of the boom actuator. In addition, the spool valve 20 receives the working fluid returning from the small chamber.

In this case, fluid in the pilot fluid passage is drained through the first portion. Accordingly, the closed state of the auxiliary valve 8 is maintained, and thus, the state of blocking the flow of fluid through the flow passage 7 is still maintained.

3) When Spool is in Third Position

When the pressure reducing valve supplies pilot fluid to the pilot fluid passage through the first portion, the supplied pilot fluid applies pilot pressure to the spool in the pressure chamber to move the spool to the third position. When the spool is in the third position, the spool valve 20 may supply working fluid to the small chamber. In addition, working fluid from the large chamber of the boom actuator may sequentially pass through the point C1 and the point C2, and then, return to the spool valve 20.

At least a portion of the supplied pilot fluid is supplied to the pilot port 1 of the boom holding valve 60 through the second portion. Here, (the poppet valve 5 of) the boom holding valve 60 is moved to allow a flow of working fluid from the large chamber of the boom actuator to the spool valve 20. Releasing the boom holding function when the spool of the spool valve 20 is in a non-neutral position, i.e. the third position, will be described in detail.

When a signal is transferred to an electronic proportional pressure reducing valve in response to a control lever being manipulated, the electronic proportional pressure reducing valve supplies pilot fluid to the pilot fluid passage. When the pilot fluid is supplied to the pilot port 1 through the pilot fluid passage (then, fluid in pilot pressure chamber 2 being drained to the tank through the drain port Dr), the auxiliary valve 8 is opened (in response to the spool of the auxiliary valve 8 being moved downwardly). Consequently, fluid in the back chamber 6 of the poppet valve 5 opens a check valve 11 and flows to the point C2 through the flow passage 7. Accordingly, the poppet valve 5 is moved upwardly in the drawing, and the holding function is released. That is, due to the release of the holding function of the poppet valve 5, the flow passage between the point C1 and the point C2 is opened. In this case, working fluid from the large chamber of the boom actuator may sequentially pass through the point C1 and the point C2, and thus, may be discharged to the tank through the spool valve 20.

In some embodiments, the hydraulic machine may include a spool valve, an arm actuator (not shown), and an arm holding valve (not shown). The arm actuator may include a small chamber and a large chamber. The arm holding valve may be provided between the spool valve and the small chamber, and may be connected to a second portion of the spool valve.

The invention claimed is:

1. A spool valve comprising:
a valve housing having a pilot fluid passage defined therein, the pilot fluid passage allowing pilot fluid to flow therethrough, and comprising a first portion and a second portion lengthwisely spaced apart from each other; and
a spool movably inserted in the valve housing, the spool comprising a plug able to enter the pilot fluid passage between the first portion and the second portion to change a flow area of the pilot fluid passage following movement of the spool,
wherein the valve housing comprises a port to which a pilot operated valve is connected, and
the second portion fluidly communicates with the port.

2. The spool valve of claim 1, wherein the plug is provided on an end of the spool.

3. The spool valve of claim 1, wherein the valve housing has a slide hole and a working fluid passage defined therein, the working fluid passage allowing working fluid to flow therethrough,
the spool further comprises a spool main body movable in the slide hole to change a flow of working fluid in the working fluid passage, and
the plug is connected to the spool main body.

4. The spool valve of claim 3, wherein the plug is connected to an end of the spool main body.

5. The spool valve of claim 1, wherein the valve housing comprises a valve body, in which the spool is movably inserted, and covers connected to the valve body to cover both ends of the spool, and
the pilot fluid passage is provided within the covers.

6. The spool valve of claim 1, wherein the valve housing comprises a pressure chamber to apply pilot pressure to the spool, and
the pressure chamber is connected to the pilot fluid passage between the first portion and the second portion.

7. A spool valve comprising:
a valve housing having a pilot fluid passage defined therein, the pilot fluid passage allowing pilot fluid to flow therethrough, and comprising a first portion and a second portion lengthwisely spaced apart from each other; and
a spool movably inserted in the valve housing, the spool comprising a plug able to enter the pilot fluid passage between the first portion and the second portion to change a flow area of the pilot fluid passage following movement of the spool,
wherein the valve housing has a cavity defined therein, in which an electronic proportional pressure reducing valve is accommodated, and
the first portion fluidly communicates with the cavity.

8. The spool valve of claim 1, wherein, when the plug enters the pilot fluid passage as deeply as possible, a flow area of the pilot fluid passage has a minimum size greater than 0.

9. The spool valve of claim 1, wherein the valve housing has a guide hole defined therein, the guide hole connected to the pilot fluid passage between the first portion and the second portion, and
the plug enters the pilot fluid passage through the guide hole.

10. The spool valve of claim 9, wherein cross-sections of the plug and the guide hole defined across lengths of the plug and the guide hole are shaped to prevent rotation of the plug.

11. A hydraulic machine comprising:
a spool valve comprising:
a valve housing having a pilot fluid passage defined therein, the pilot fluid passage allowing pilot fluid to flow therethrough, and comprising a first portion and a second portion lengthwisely spaced apart from each other; and
a spool movably inserted in the valve housing, the spool comprising a plug able to enter the pilot fluid passage between the first portion and the second portion to change a flow area of the pilot fluid passage following movement of the spool;
an actuator connected to the spool valve, and comprising a first chamber and a second chamber; and
a holding valve provided between the spool valve and the first chamber, the holding valve connected to the second portion,
wherein, when the spool is in a first position in which a flow of working fluid between the spool valve and the actuator is blocked, and
wherein fluid within the pilot fluid passage is drained through the first portion, and the holding valve blocks a flow of working fluid from the first chamber to the spool valve.

12. The hydraulic machine of claim 11, wherein the holding valve comprises:
a poppet valve allowing or blocking the flow of working fluid between the first chamber and the spool valve; and
an auxiliary valve connected to the poppet valve,
the second portion being connected to the auxiliary valve.

13. The hydraulic machine of claim 11, wherein the actuator comprises a boom actuator, the first chamber comprises a large chamber, and the second chamber comprises a small chamber, and the holding valve comprises a boom holding valve.

14. The hydraulic machine of claim 11, wherein the actuator comprises an arm actuator, the first chamber comprises a small chamber, and the second chamber comprises a large chamber, and the holding valve comprises an arm holding valve.

15. A hydraulic machine comprising:

the spool valve as claimed in claim 1;

an actuator connected to the spool valve, and comprising a first chamber and a second chamber; and a holding valve provided between the spool valve and the first chamber, the holding valve connected to the second portion, wherein, when the spool moves to a second position in which the spool valve forwards working fluid to the first chamber and receives working fluid from the second chamber, and wherein fluid within the pilot fluid passage is drained through the first portion, and the holding valve moves to allow a flow of working fluid from the spool valve to the first chamber.

16. A hydraulic machine comprising:

the spool valve as claimed in claim 1;

an actuator connected to the spool valve, and comprising a first chamber and a second chamber; and a holding valve provided between the spool valve and the first chamber, the holding valve connected to the second portion, wherein, when pilot fluid is supplied to the pilot fluid passage through the first portion, at least a portion of the supplied pilot fluid is provided to the holding valve through the second portion, so that the holding valve moves to allow a flow of working fluid from the first chamber to the spool valve, and the spool moves to a third position in which the spool valve forwards working fluid to the second chamber, and receives working fluid from the first chamber.

17. The hydraulic machine of claim 16, wherein the first portion is connected to a pressure reducing valve, such that the pilot fluid passage fluidly communicates with the pressure reducing valve.

18. The hydraulic machine of claim 17, wherein the pressure reducing valve comprises an electronic proportional pressure reducing valve.

19. The hydraulic machine of claim 17, wherein the valve housing comprises a pressure chamber to apply pilot pressure to the spool, the pressure chamber is connected to the pilot fluid passage between the first portion and the second portion, and when the pressure reducing valve supplies the pilot fluid to the pilot fluid passage through the first portion, at least a portion of the supplied pilot fluid applies pilot pressure to the spool in the pressure chamber to move the spool to the third position.

* * * * *